United States Patent
Igarashi

(10) Patent No.: US 6,614,595 B2
(45) Date of Patent: Sep. 2, 2003

(54) STEREO ENDOSCOPE

(75) Inventor: Tsutomu Igarashi, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/783,954

(22) Filed: Feb. 16, 2001

(65) Prior Publication Data

US 2002/0114071 A1 Aug. 22, 2002

(51) Int. Cl.[7] .................. G02B 27/22; G02B 21/22; A61B 1/04; A61B 1/06; H04N 13/00
(52) U.S. Cl. .................. 359/464; 359/462; 359/376; 359/377; 359/378; 600/111; 600/166; 348/45
(58) Field of Search ................ 359/464, 462, 359/375, 376, 378, 480, 482; 600/111, 112, 166; 348/45

(56) References Cited

U.S. PATENT DOCUMENTS

| | | | |
|---|---|---|---|
| 4,862,873 A | * 9/1989 | Yajima et al. .................. 128/6 |
| 4,924,853 A | 5/1990 | Jones, Jr. et al. | |
| 5,527,263 A | 6/1996 | Zobel et al. | |
| 5,588,948 A | * 12/1996 | Takahashi et al. .......... 600/111 |
| 5,689,365 A | 11/1997 | Takahashi .................... 359/362 |
| 5,702,350 A | 12/1997 | Vry et al. ..................... 600/166 |
| 5,743,846 A | * 4/1998 | Takahashi et al. .......... 600/166 |
| 5,743,847 A | 4/1998 | Nakamura et al. .......... 600/166 |
| 5,976,071 A | 11/1999 | Sekiya ........................ 600/111 |
| 6,066,090 A | * 5/2000 | Yoon ........................... 600/113 |
| 6,471,642 B1 | * 10/2002 | Igarashi ...................... 600/166 |
| 2002/0035310 A1 | * 3/2002 | Akui et al. .................. 600/111 |

FOREIGN PATENT DOCUMENTS

| JP | 64-24215 A | 1/1989 |
|---|---|---|
| WO | WO 94/28783 | 12/1994 |

* cited by examiner

*Primary Examiner*—Audrey Chang
(74) *Attorney, Agent, or Firm*—Armstrong, Westerman & Hattori, LLP

(57) ABSTRACT

A stereo endoscope having right and left optical systems for stereoscopic observation which form the right and left images, respectively. The stereo endoscope further including a third optical system which has a wider field of view and a smaller maximum lens diameter than the right and left optical systems.

9 Claims, 8 Drawing Sheets

(a)

(b)

(a)

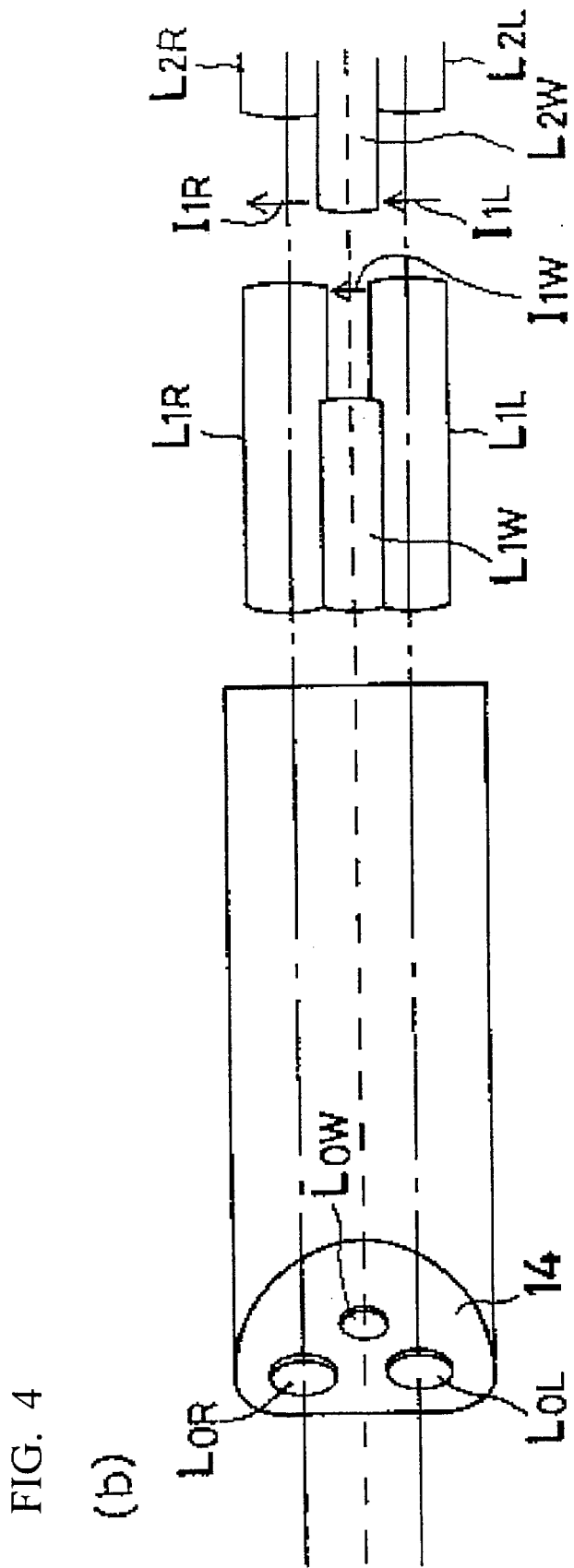

STEREO ENDOSCOPE

FIELD OF THE INVENTION

This invention relates to an optical system for a stereo endoscope.

BACKGROUND OF THE INVENTION

Conventionally, optical systems for stereo endoscope are known, as described in U.S. Pat. Nos. 4,924,853 and 5,527,263.

In endoscopic surgery, both a wide angle image and a magnified image are required. The wide angle image is used for finding an organ, a disease, or a treatment tool and the magnified image is used for treatment.

A conventional rigid endoscope usually has only one observation optical system. When a wide angle objective lens is arranged in the optical system, the above-mentioned needs are carried out by using one of following methods: (a) changing the distance to an object; and (b) using an optical zoom function on a TV camera system to connect.

On the other hand, an endoscopic robot surgery system has been recently developed. In this system, surgical treatment tools and an endoscope are operated remotely by a surgeon. Since the robot enables precise surgical treatment, surgeons require the endoscope to have better image capabilities with higher magnification and higher resolution at the time of treatment.

When the above methods (a) or (b) are used in endoscopic robot surgery in order to get a magnified image of a object, the following problems arise.

For method (a), if a rigid endoscope is brought close to a target object, interference between the endoscope and treatment tools will cause a problem. Therefore, the field angle of view should be narrow at the time of treatment to get both high magnification and long working distance (WD). However, if an objective lens has a narrow angle, the wide angle image needed for finding an organ, a disease or a treatment tool will not be obtained.

For method (b), a combination of a wide angle rigid endoscope and a camera system with an optical zoom function enables both a wide image as well as a high magnification image. But the high magnification image quality is worse than the wide image because the point spread property of the rigid endoscope is fixed and the final point spread property at the imaging surface in the camera system is magnified according to the optical zoom state in the camera system. A longer focal length of the zoom optics makes the final point spread property worse. This deterioration of the image quality at a high magnification state is not suitable for precise treatment.

Moreover, in the endoscopic robot surgery system, a stereo endoscope system is preferred in order to obtain a depth perception. In this case, however, the following additional problem arise.

First, it is more difficult to get a good image quality than in the case of a two-dimensional image (2D). In the stereo endoscope, it is necessary to transmit the right and left images within the space of the limited insertion part. In this case, image quality of the stereo endoscope will be degraded more than in the case of 2D.

Second, it is difficult to add a zoom function in the stereo endoscope system while keeping the right and left optical conditions satisfied.

SUMMARY OF THE INVENTION

In view of the foregoing disadvantages inherent in the known types of prior art, the present invention solves the above-mentioned problems. Thus, it is an object of the present invention to provide a stereo endoscope which gives both a wide angle image for finding an organ or treatment tools and high magnification stereoscopic images used for a precise treatment.

A stereo endoscope of the present invention which attains the above objective comprises, a right optical system which forms a right image for stereoscopic observation and which comprises a right objective optical system and a right relay optical system, a left optical system which forms a left image for stereoscopic observation and which comprises a left objective optical system and a left relay optical system, a third optical system which forms a third image for finding an organ or treatment tools and which comprises a third objective optical system and a third relay optical system, wherein the axes of the right, left and third relay optical systems are arranged in parallel, respectively.

The three optical systems according to this invention satisfy the following conditions.

(1) FAw/FAlr>1.3

(2) 0.3<LDw/LDlr<0.8

FAw represents a field an angle of view of the third optical system; FAlr represents a field angle of view of the right or left optical system; LDw represents a maximum lens diameter of the third relay optical system; and LDlr represents a maximum lens diameter of the left or right relay optical system.

Such constitution can obtain both a wide angle image used for finding an organ, a disease or a treatment tool and narrow angle stereoscopic images with high resolution used for precise treatment.

The first condition (1) means that the field angle of view of the third optical system is significantly larger than that of right and left optical systems. The constant 1.3 in the first condition (1) is selected in order to obtain a significant difference in a visual field area. The constant 1.3 is the square root of 1.7 and the value 1.7 means the difference in the visual field area. The 1.7 times difference seems to be a minimum for a practical stereo endoscope design. Moreover, it is desirable that the ratio of FAw/FAlr is larger than 1.3 in order to obtain a larger difference in the field of view between the stereo images and the third image. For example, in the case that FAlr is 40 degrees for cardiac surgery, FAw should be more than 52 degrees. In another case, if FAlr is 60 degrees for general abdominal surgery, FAw should be more than 78 degrees.

If the first condition (1) is not satisfied, the third optical system bears no significance to finding an organ or treatment tools because the difference in the field of view between the stereo Images and the third image is too small. Therefore, it is desirable that the first condition (1) be satisfied.

The second condition (2) means that the maximum lens diameter of the right and left relay optical systems are significantly larger than that of the third relay optical system. The upper limit constant 0.8 in the second condition (2) is selected in order to obtain a significant difference in the effective aperture size of the relay optical systems. In general, a maximum lens diameter of a relay optical system relates to the optical numerical aperture (NA) of the relay optical system.

The stereo endoscope in this invention has an insertion tube. Right, left and third relay optical systems must be supported in the insertion tube of the stereo endoscope. Therefore, it is very important to optimize the maximum lens diameter of the relay optical systems. Furthermore, since the maximum lens diameter of an objective optical system is the same as or smaller than that of a relay optical system, in general, it is enough for this invention to compare the maximum lens diameter of the relay optical systems.

Since the maximum lens diameter of the right relay optical system should be the same as that of the left relay optical system, the ratio of the maximum lens diameter of the third relay optical system to that of the right and the left optical systems is one of the most important parameters. Since the right and the left optical systems must be designed with high resolution for precise treatment, it is necessary for the right and the left optical system to have a large NA in order to get a high resolution according to diffraction theory. Enlarging the lens diameter is one of the effective methods to get a large NA because in general NA of a relay optical system is proportional to the maximum lens diameter of the relay optical system. Since the third relay optical system is used for finding, image quality of the third optical system is permissible even if it is somewhat bad. Therefore, NA of the third relay optical system may be smaller than that of the right and the left relay optical systems. However, too small a NA of the third relay system causes brightness problem of the third image. The lower limit constant 0.3 in the second condition (2) is selected so that the third relay optical system has a permissible lower NA. For example, in the case that LDlr is 4.15 mm for an outer diameter 12 mm of the insertion tube, LDw should be within 1.25 mm to 3.32 mm.

If the second condition (2) is not satisfied, it is difficult to obtain enough image quality in the stereoscopic observation for a precise treatment, or enough brightness in third image for finding an organ. Therefore, it is desirable that the second condition (2) is satisfied.

Moreover, it is desirable that the right, left and third objective optical systems have nearly the same direction of view regardless of the direct or oblique direction of view.

In the case of getting an oblique direction of view, it is desirable that the right, left, and third objective optical systems share a prism unit to get the oblique field direction. In the case of using respective prism units correspondent to the objective optical systems, it is difficult to reduce the difference in the direction of view between the objective optical systems without precise adjustment. However, if the prism unit is shared, the difference in the direction of view will be made small without adjustments.

Furthermore, it is desirable that the right, left, and the third relay optical systems form exit pupils on an exit pupil plane near the exit end of the relay optical systems respectively, and that the exit pupils do not overlap with each other in order to have the branch ray bundles passing through the exit pupils of the relay optical systems. If the pupils overlap on the pupil plane, it is impossible to separate the pupils completely after the relay optical system without cross-talk (an image of a certain optical system mixes with another image of another optical system). Accordingly, it is desirable to take such an arrangement.

In this case, it is desirable to further have an optical means on the rear side of the relay optical system to separate the pupils made by the relay optical system and to form real images. Such stereo endoscope further comprises, a right image formation optical system which is on the rear side of the right relay optical system and which has a right axis conversion means, a left image formation optical system which is on the rear side of the left relay optical system and which has a left axis conversion means, a third image formation optical system which is on the rear side of the third relay optical system, wherein the right and left axis conversion means are designed so that ray bundles passing through the exit pupil of the third relay optical system are not interfered.

It is further desirable that the stereo endoscope according to such constitution have the third image formation optical system include a third axis conversion means, wherein the third axis conversion means is designed so that the exit optical axis of the third axis conversion means is at the center of the right and left exit optical axes which are made by the right and left axis conversion means.

DETAILED DESCRIPTION OF THE PREFERRED EMBODIMENT

With reference to the accompanying drawings, examples of the stereo endoscope illustrating the embodiments of the present invention, will be described hereinafter.

Figure 1:
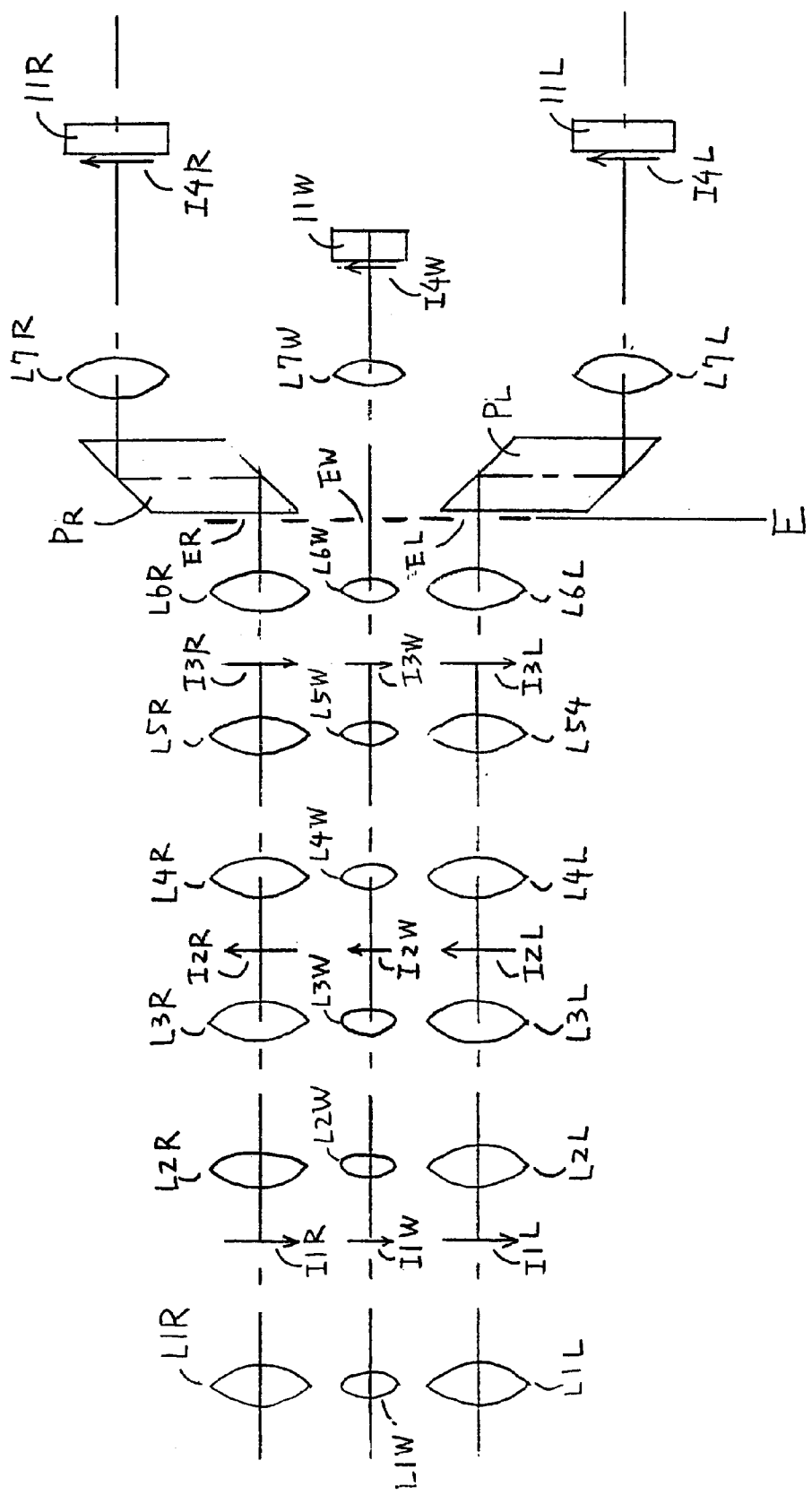
FIG. 1 is an optical-path diagram showing a stereo endoscope according to the first embodiment of the present invention.

FIG. 1 illustrates an optical-path diagram showing a stereo endoscope according to the first embodiment of the present invention. The right optical system is equipped with a right objective system (a lens system L1R), a right relay optical system (lens systems L2R–L6R), and a right image-formation optical system (a right prism unit PR and a lens system L7R). The left optical system is equipped with a left objective optical system (a lens system L1L), a left relay optical system (lens systems L2L–L6L), and a left image-formation optical system (a left prism unit PL and a lens system L7L). The right optical system (L1R–L7R) and the left optical system (L1L–L7L) are symmetrical. The third optical system is equipped with a third objective optical system (a lens system L1W), a third optical system (lens systems L2W–L6W), and a third image-formation optical system (LW7).

The lens systems L1R, L1L and L1W form real images I1R, I1L, and I1W, respectively. Lens systems L2R–L6R, L2L–L6L and L2W–L6W transfer the images and each have two intermediate real images I2R–I3R, I2L–I3L, and I2W–I3W, respectively.

Each of the relay optical systems may include a plurality of intermediate images other than the two to change the insertion length. Further, the number of the intermediate images of the third relay optical system may be different from that of the right or left relay optical systems.

Each of the lens systems L6R, L6L and L6W are afocal conversion lens systems and form exit pupils ER, EL, and EW on an exit pupil plane E, respectively. The exit pupils ER, EL, and EW are designed so as not to overlapped with each other. In this invention, the lens systems L6R, L6L and L6W are regarded as components of their respective relay optical systems. These three objective and relay optical systems are arranged in parallel.

FIG. 2(a) is a cross section of the relay optical systems shown in FIG. 1. The lens systems L2R–L6R, L2L–L6L, and L2W–L6W in the relay optical systems are supported by tubes 18R, 18L, and 18W, respectively, and have certain angles around the central axis O of insertion tube 17 as shown in FIG. 2(a). Since the tubes 18R, 18L, and 18W are arranged so that they may have a parallel axis, optical axes of L2R–L6R, L2L–L6L, and L2W–L6W optical are also parallel. However, FIG. 1 illustrates these lens systems L2R–L6R, L2L–L6L, and L2W–L6W on the same plane in order to make the explanation easier. As for the lens systems L2R–L6R and L2L–L6L, it is desirable to arrange them at respective positions having the same distance from the central axis O.

As shown in FIG. 2(a), the inner diameter of the tubes for the right and the left relay optical systems is larger than the inner diameter of the tube for third relay optical system. This means that the maximum lens diameter of the right and left lens systems L2R–L6R and L2L–L6L is larger than the maximum lens diameter of the third lens system L2W–L6W.

Each of the image-formation optical systems consist of parallel prisms, as respective axis shifting members, and lens systems as shown in FIG. 1. In FIG. 1, the parallelogram prisms PR and PL branch the ray bundles passing through the pupils ER, EL, and EW. Lens systems L7R, L7L, and L7W form images 14L. 14R, and 14W on the image-pick-up elements (for example, CCD) 11R, 11L and 11W on either side.

The parallelogram prisms PR and PL may be arranged near the pupils ER and EL on either side. PR is arranged to transfer only the ray bundle from the pupil ER, and PL is arranged to transfer only the ray bundle from the pupil EL. The parallelogram prisms PR and PL shift the optical axes in the outside direction in parallel, respectively, and the images I4R and I4L are formed on image-pick-up elements 11R and 11L by the lens systems L7R and L7L of the same optical property, respectively.

In this example, the optical path to obtain the wide angle image I4W is not shifted, and the wide angle image I4W is formed on the image-pick-up element 11W by the image-formation lens system L7W.

Figure 2:
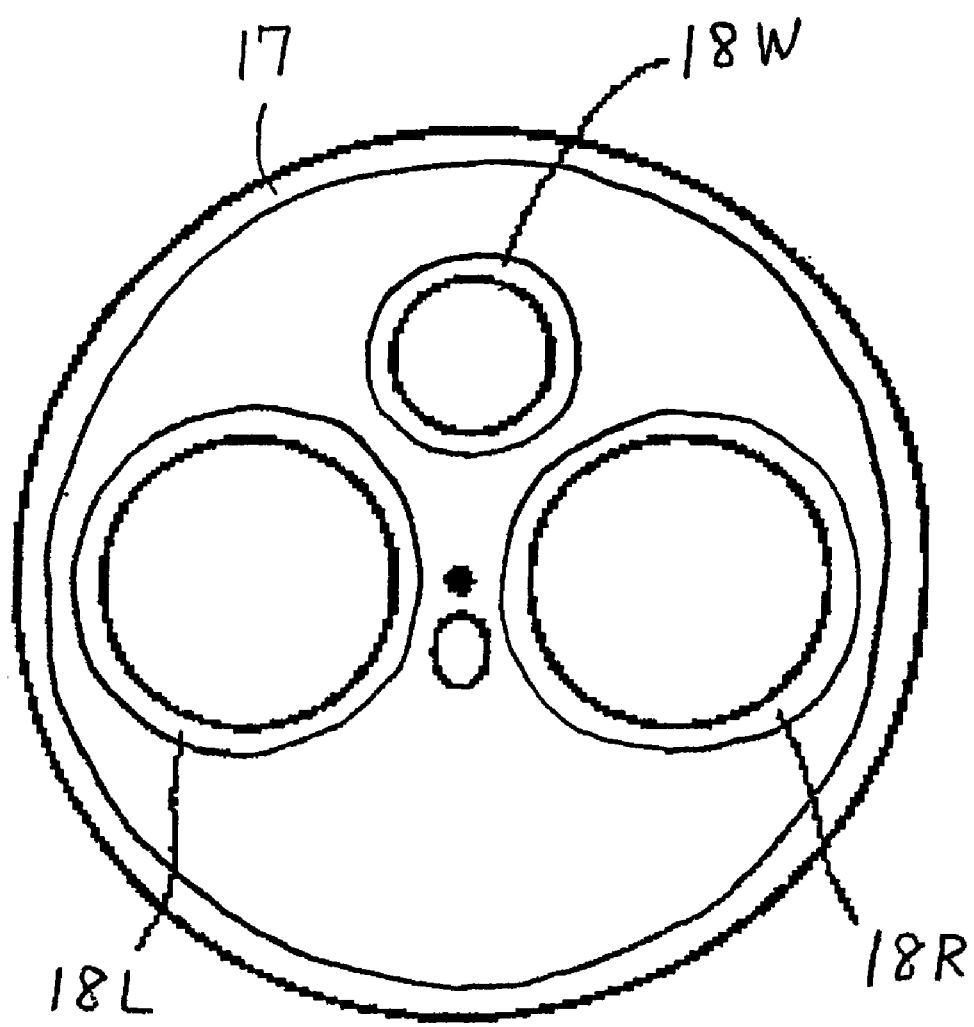
FIG. 2(a) is a cross sectional diagram of the relay optical systems of FIG. 1.
FIG. 2(b) is a rear elevation diagram at the pupil plane E in FIG. 1.
Figure 2:
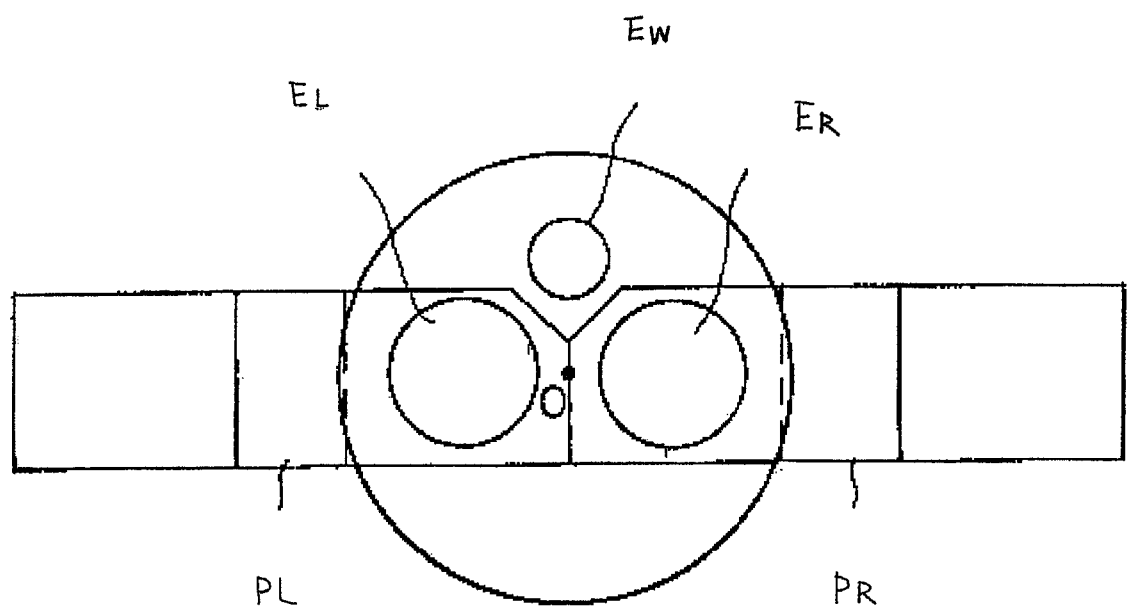

FIG. 2(b) is a rear elevation diagram at the pupil plane E in FIG. 1. The prisms PR and PL of FIG. 2 (b) are partially chipped so that the ray bundle from the pupil EW may not be rejected by the prisms. The stereo optical systems comprising L1R–L7R, L1L–L7L, PR, and PL are designed so as to have comparatively narrow fields of view and to form images with high resolution. In contrast, the third optical system comprising L1W–L7W is designed to have a wider field of view and is used for finding an organ and treatment tools.

Figure 3:
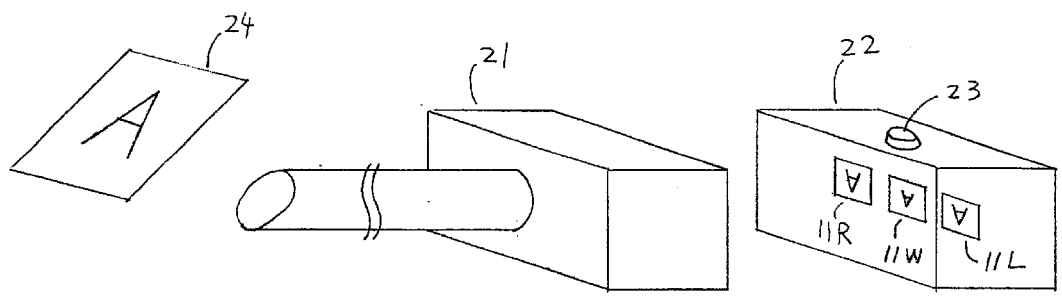
FIGS. 3(a)–3(c) show a perspective diagram of a stereo endoscope system according to the present invention, a diagram showing ordinary and upside-down image postures and a side view diagram showing constitution of a third axis conversion prism, respectively.
Figure 3:
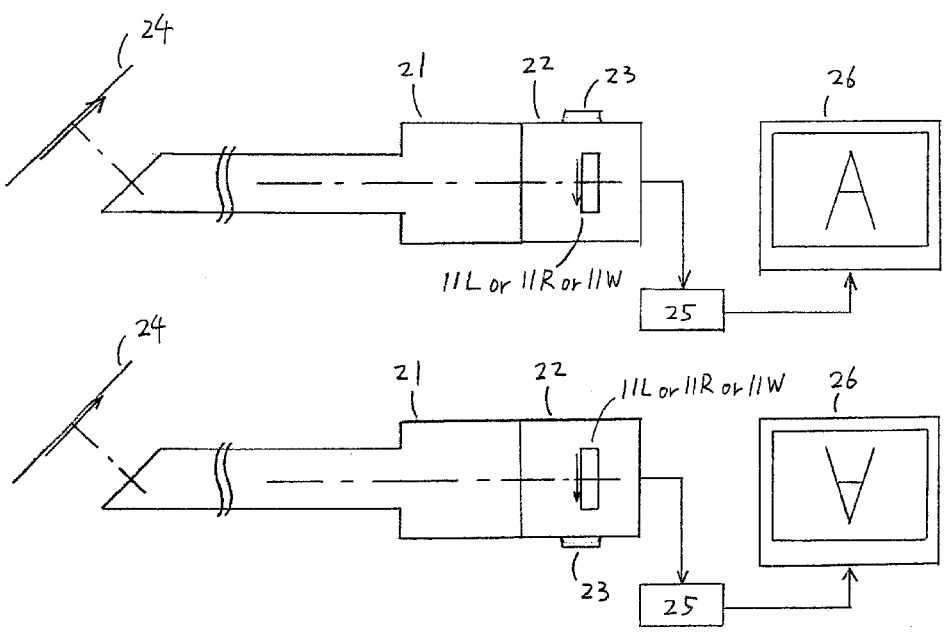
Figure 3:
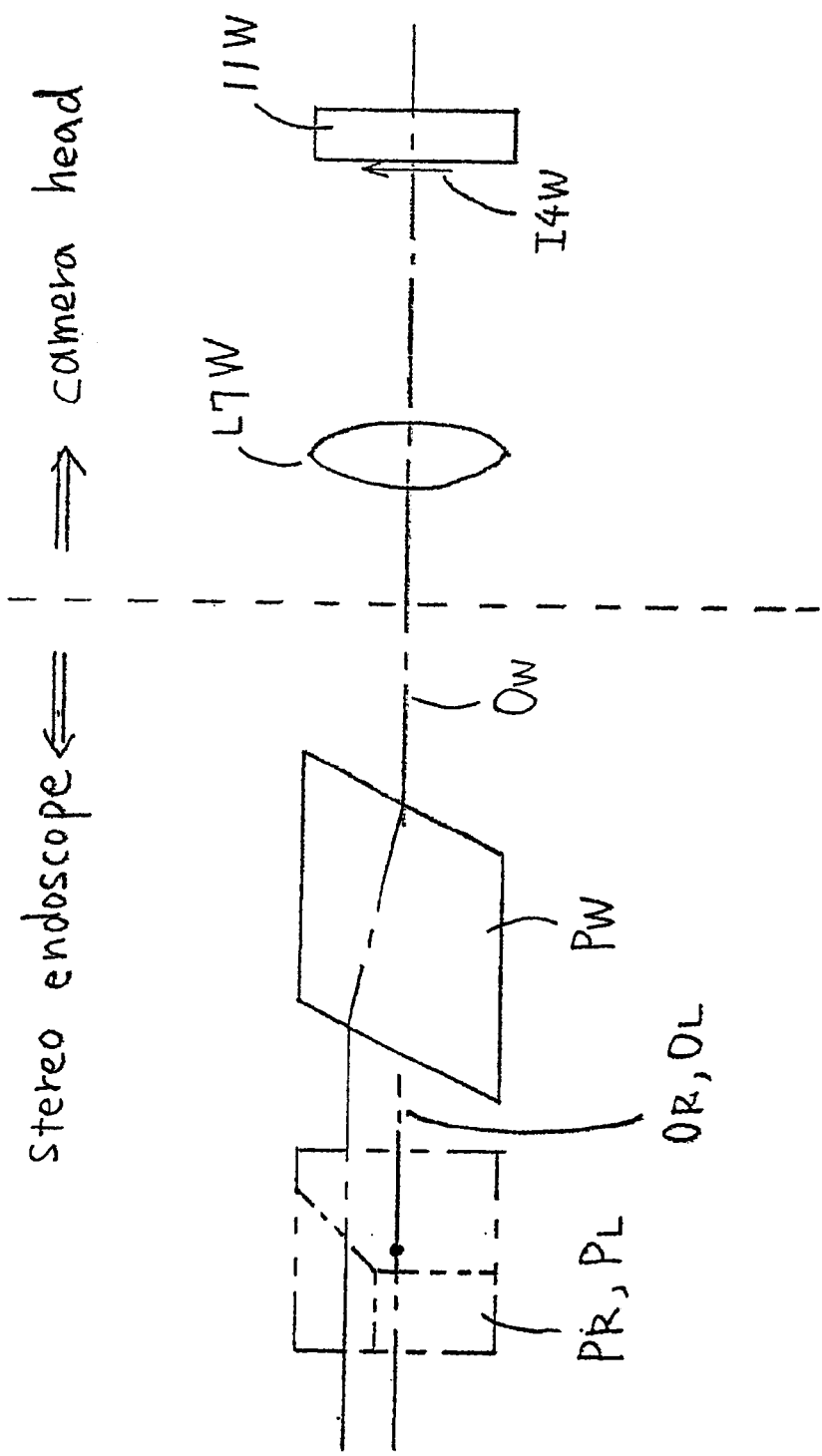

FIGS. 3(a)–3(c) are diagrams showing an example wherein both ordinary and upside down images can be produced without and image defects. Surgeons used to require different preferable postures for observing an image to enhance treatment operation. In the case of a stereo endoscope system according to the present invention, special constitution is required to change the posture of all the images including stereoscopic and wide images.

FIG. 3(a) is a perspective diagram of a stereo endoscope system according to the present invention. The stereo endoscope system comprises a stereo endoscope 21 and a camera head 22. The camera head 22 has image-pick-up elements 11R, 11L and 11W and upside mark 23 to show the posture of the camera head 22. Images of an observed object 24 are produced on each of the image-pick-up elements 11R, 11L and 11W, respectively.

FIG. 3(b) is a diagram showing an ordinary and an upside-down image posture for an image channel. A camera control unit 25 and a TV-monitor 26 are further connected to the camera head 22, shown in FIG. 3(a). In the upper diagram of FIG. 3(b), the camera head 22 is connected to stereo the endoscope 21 so that the upside mark 23 is on the upper side. In this case, character "A" which is an image of the object 24 is shown on the TV-monitor 26.

In contrast, in the lower diagram of FIG. 3(b), the camera head 22 is connected to the stereo endoscope 21 so that the upside mark 23 is on the lower side. In this case, reversed character "A" is shown on the TV-monitor 26.

It is desirable to get both the ordinary and the upside-down image postures by changing the connection between the stereo endoscope 21 and the camera head 22. To implement this function, all the optical axes must be connected correctly for both the ordinary and the upside-down connections. Such requirements make it necessary to consider the constitution of the third optical system.

FIG. 3(c) is a side view of a stereo endoscope system which enables the connection between the endoscope and the camera head to be changed upside-down to a reverse image posture. In addition, the third image-formation optical system further comprises a parallelogram prism PW as a third axis conversion means.

The prism PW is designed so that an exit optical axis OW of the prism PR is at the center of the right and left optical axes OR and OL which are made up by the prisms PR and PL, respectively. The prism PW performs axis conversion with using only refraction.

As shown in FIG. 3(c), all the exit optical axes OR, OL and OW are on the same line. Such constitution yields the advantage of being able to change the postures of the images upside-down without any image defects. If the lens systems L7R, L7L and L7W and image-pick-up elements 11R, 11L and 11W are covered in a camera head which is separated from the stereo endoscope as shown in FIGS. 3(a) and 3(b), both ordinary and upside-down connections between the stereo endoscope and the camera head are obtainable without any image defects. Thus, a surgeon can select either connection to obtain preferable image postures for treatment.

Figure 4:
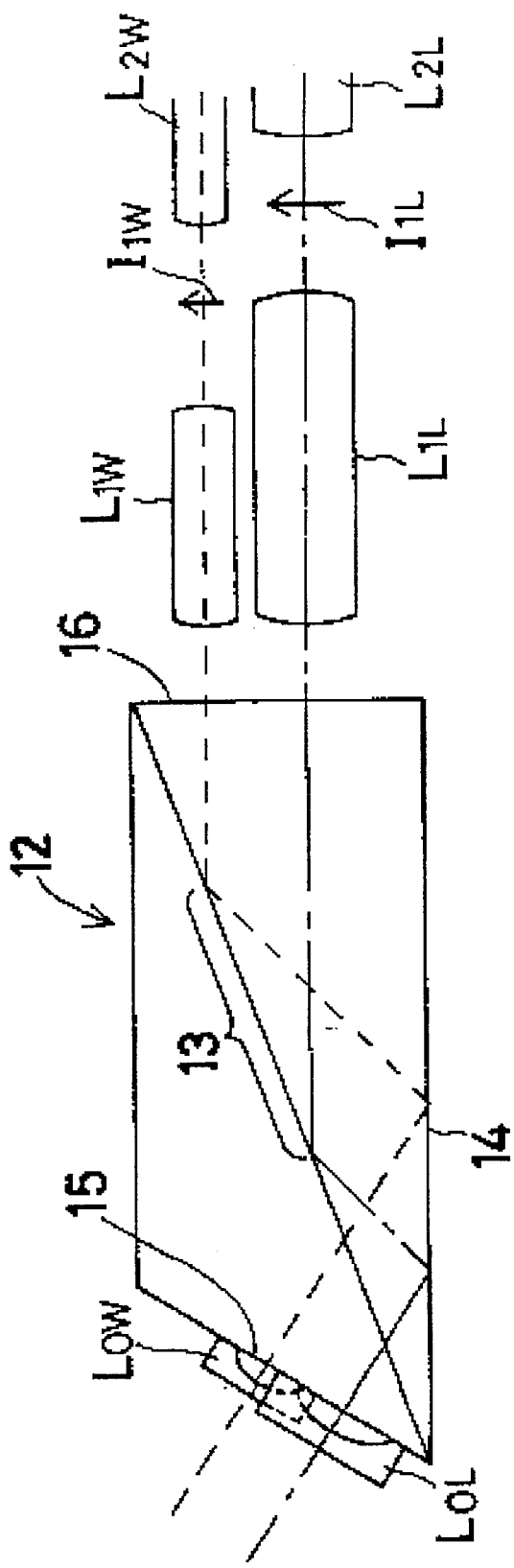
FIGS. 4(a)–4(c) show a side view, plan view and perspective view of the arrangement and the constitution of the direction conversion prism unit used to get an oblique direction of view, respectively.
Figure 4:
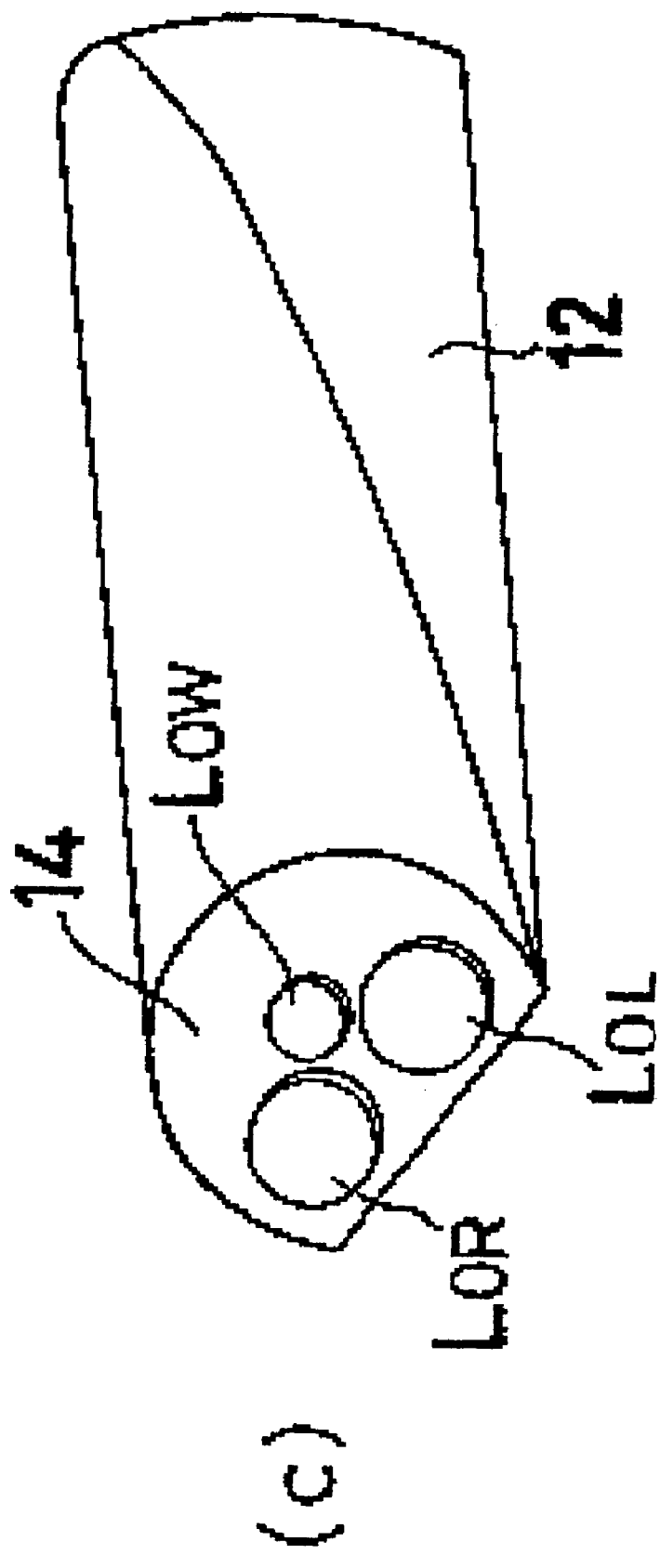

In FIG. 1, the lens systems L1R, L1L, and L1W have the same direction of view. However, a common direction conversion optical means may be arranged in the front side of the lens systems L1L, L1R, and L1W to get an oblique direction of view. FIGS. 4(a)–4(c) show a conversion prism unit 12 arranged in common to the three lens systems L1R, L1L and L1W, wherein FIG. 4(a) is a side view, FIG. 4(b) is a plan view and FIG. 4(c) is a perspective view. The direction conversion prism unit 12 consists of two prism components which are cemented and include incidence plane 15, reflecting plane 14, reflecting plane 13 and emission plane 16. The plane 14 is parallel to the axis of the rear side of the objective optical system and is designed to have a total-reflection property. The plane 13 is inclined to the axis and is designed to have a total-reflection property. A ray injected from the object side passes through the incidence plane 15, is reflected by planes 13 and 14, and passes through the emission plane 16. All rays passing through the prism unit 12 are bent to the same direction by the prism unit 12. Therefore, the same oblique directions of view are obtained simultaneously when the prism unit 12 is used in common.

In addition, negative lenses L0L, L0R and L0W are arranged coaxially to the optical axes of L1L, L1R, and L1W on the incidence plane 15 of the prism unit 12. These lenses L0L, L0R, and L0W are regarded as components of their respective objective optical systems.

Next, a specification example of a stereo endoscope is shown.
Effective length of an insertion part: 390 mm
Outer diameter of an insertion tube: 12 mm
<Right (Left) optical systems>
Maximum lens outer diameter of the relay optical system: 4.15 mm
Field of view: 60 degrees
Best working distance: 50 mm
Distance between optical axes of L1L and L1R (stereo base length): 4.6 mm
Total length (from the first surface to the exit pupil plane E): 450 mm
<Third optical system>
Maximum lens outer diameter of the relay optical system: 2.2 mm
Field of view: 90 degrees
Best working distance: 50 mm
Total length (from the first surface to the exit pupil plane E): 450 mm (1) FAw/FAlr=1.5
(2) LDw/LDlr=0.53

As mentioned above, the stereo endoscope of this invention has been demonstrated based on these embodiments. However, this invention is not limited to these embodiments and other variations are applicable.

The above explanation shows that a stereo endoscope according to this invention has right and left optical systems with a narrow field angle and a large lens diameter, and a third optical system with a wide field angle of view and a small lens diameter. Therefore, the stereo endoscope can obtain simultaneously a wide angle image for finding an organ and high magnification stereo images used for precise treatment.

What is claimed is:

1. A stereo endoscope system comprising:
    a right optical system which forms a right image for stereoscopic observation, said right optical system includes a right objective optical system and a right relay optical system;
    a left optical system which forms a left image for stereoscopic observation, said left optical system includes a left objective optical system and a left relay optical system, and said right image and left image are images of a same object and have a parallax with each other; and
    a third optical system which forms a third image, said third optical system includes a third objective optical system and a third relay optical system,
    said optical systems satisfy the following conditions:
    (1) FAw/FAlr>1.3; and
    (2) 0.3<LDw/LDlr<0.8, wherein
        FAw is the field angle of view of said third optical system,
        FAlr is the field angle of view of said right and left optical systems;
        LDw is the maximum lens diameter of said third relay optical system; and
        LDlr is the maximum lens diameter of said left and right relay optical systems.

2. The stereo endoscope system according to claim 1, wherein said right, left, and third objective optical systems share a prism unit so as to have a same oblique direction of view.

3. The stereo endoscope system according to claim 2, further comprising:
    a camera head with first, second and third image-pick-up elements, wherein said stereo endoscope and said camera head are designed so as to connect both ordinary and upside-down postures in order to change postures of first, second and third images picked-upped by said image pick-up elements.

4. The stereo endoscope system according to claim 1, wherein all of said relay optical systems from exit pupils on a plane near an exit end of said respective relay optical systems, and said exit pupils do not overlap with each other.

5. The stereo endoscope system according to claim 4 further comprising:
    a right image formation optical system which is on the rear side of said right relay optical system and which has a right axis-shifting member;
    a left image formation optical system which is on the rear side of said left relay optical system and which has a left axis-shifting member; and
    a third image formation optical system disposed on the rear side of said third relay optical system, which said right and left axis shifting members are designed so that ray bundles passing through the exit pupil of said third relay optical system are not rejected.

6. The stereo endoscope system according to claim 5 wherein said third image formation optical system has a third axis shifting member, and said third axis shifting member is designed so that the exit optical axis of said third axis shifting member is at the center of the right and left exit optical axes which are made by said right and left axis shifting members, respectively.

7. The stereo endoscope system according to claim 6, further comprising:
    a camera head with a first, second and third image-pick-up elements, wherein said stereo endoscope and said camera head are designed so as to connect both ordinary and upside-down postures in order to change postures of first, second and third images picked-upped by said image pick-up elements.

8. A stereo endoscope system according to claim 1, wherein said right, left and third optical system are substantially parallel to each other.

9. A stereo endoscope system according to claim 8, wherein said right, left and third optical systems are arranged in a common insertion tube.

* * * * *